(12) United States Patent
Naito

(10) Patent No.: US 8,778,452 B2
(45) Date of Patent: Jul. 15, 2014

(54) METHOD OF MANUFACTURING OPTICAL WAVEGUIDE

(75) Inventor: Ryusuke Naito, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 0 days.

(21) Appl. No.: 13/173,887

(22) Filed: Jun. 30, 2011

(65) Prior Publication Data

US 2012/0003385 A1  Jan. 5, 2012

(30) Foreign Application Priority Data

Jul. 5, 2010  (JP) .................. 2010-153342

(51) Int. Cl.
   *B05D 5/06* (2006.01)

(52) U.S. Cl.
   USPC ........................ 427/163.2; 427/133

(58) Field of Classification Search
   USPC ............................ 427/133, 163.2
   See application file for complete search history.

(56) References Cited

U.S. PATENT DOCUMENTS

| | | | |
|---|---|---|---|
| 3,957,411 A * | 5/1976 | Schiesser .................. | 425/215 |
| 2003/0117614 A1 | 6/2003 | Kikuchi et al. | |
| 2005/0212182 A1 | 9/2005 | Yokoyama et al. | |
| 2006/0091571 A1 * | 5/2006 | Akutsu et al. ............... | 264/1.24 |
| 2007/0014523 A1 * | 1/2007 | Ohtsu et al. .................. | 385/89 |
| 2007/0064188 A1 | 3/2007 | Okamoto | |
| 2008/0013903 A1 | 1/2008 | Fujii et al. | |
| 2008/0193094 A1 | 8/2008 | Enami et al. | |
| 2008/0198144 A1 | 8/2008 | Shimizu et al. | |
| 2008/0277809 A1 * | 11/2008 | Shimizu ...................... | 264/1.24 |
| 2009/0196559 A1 | 8/2009 | Makino et al. | |
| 2009/0261488 A1 | 10/2009 | Shimizu | |
| 2009/0286187 A1 | 11/2009 | Hodono et al. | |
| 2012/0251038 A1 | 10/2012 | Nagafuji et al. | |

FOREIGN PATENT DOCUMENTS

| | | |
|---|---|---|
| CN | 101303436 A | 11/2008 |
| CN | 101561532 A | 10/2009 |
| JP | 51-42760 A | 4/1976 |
| JP | S60-141512 A | 7/1985 |
| JP | 61-138903 A | 6/1986 |
| JP | 5-228946 A | 9/1993 |
| JP | 2002-120286 A | 4/2002 |

(Continued)

OTHER PUBLICATIONS

U.S. Office Action dated Sep. 17, 2012, issued in copending related U.S. Appl. No. 13/173,391.

(Continued)

*Primary Examiner* — Elizabeth Burkhart

(74) *Attorney, Agent, or Firm* — Westerman, Hattori, Daniels & Adrian, LLP

(57) ABSTRACT

A mold for the formation of an over cladding layer in an optical waveguide is integrally produced from a light-transmissive resin and a light-transmissive support plate by molding using a mold member identical in shape with the over cladding layer. In the production of the mold, a hollow resulting from the removal of the mold member serves as a cavity for the formation of the over cladding layer. For the formation of the over cladding layer, the cavity of the mold is filled with a photosensitive resin for the formation of the over cladding layer, and the photosensitive resin is cured by being exposed to light through the mold while cores formed in a pattern on a surface of an under cladding layer are immersed in the photosensitive resin.

8 Claims, 3 Drawing Sheets

(56) References Cited

FOREIGN PATENT DOCUMENTS

| | | | |
|---|---|---|---|
| JP | 2002-321227 A | 11/2002 |
| JP | 2004-050493 A | 2/2004 |
| JP | 2004-117585 A | 4/2004 |
| JP | 2004-184480 A | 7/2004 |
| JP | 2005-017816 A | 1/2005 |
| JP | 2005-290106 A | 10/2005 |
| JP | 2008-203431 A | 9/2008 |
| JP | 2008-281654 A | 11/2008 |
| JP | 2009-258417 A | 11/2009 |
| JP | 2009-276724 A | 11/2009 |
| WO | 2008/062836 A1 | 5/2008 |

OTHER PUBLICATIONS

U.S. Office Action dated Sep. 25, 2012, issued in copending related U.S. Appl. No. 13/236,781.
Notice of Allowance and Fee(s) Due dated Mar. 7, 2013, issued in related U.S. Appl. No. 13/173,391.
U.S. Office Action dated Dec. 20, 2012, issued in related U.S. Appl. No. 13/113,220.
Japanese Office Action dated Jun. 11, 2013, issued in corresponding Japanese Patent Application No. 2010-153342, w/ English translation.
Japanese Office Action dated Jun. 11, 2013, issued in related Japanese Patent Application No. 2010-153343, w/ English translation.
Office Action dated Jun. 25, 2013, issued in related Japanese Patent Application No. 2010-126714, with English Translation.
U.S. Non-Final Office Action dated Sep. 10, 2013, issued in related U.S. Appl. No. 13/113,220.
U.S. Final Office Action dated Apr. 3, 2013, issued in related U.S. Appl. No. 13/236,781.
U.S. Final Office Action dated May 31, 2013, issued in related U.S. Appl. No. 13/113,220.
U.S. Non-Final Office Action dated Aug. 16, 2013, issued in related U.S. Appl. No. 13/173,391.
U.S. Office Action dated Dec. 2, 2013, issued in related U.S. Appl. No. 13/173,391.
Chinese Office Action dated Dec. 4, 2013, issued in corresponding Chinese Patent Application No. 201110186064.1 with English translation (15 pages).
Chinese Office Action dated Dec. 6, 2013, issued in related Chinese Patent Application No. 201110186062.2 with English translation (14 pages).
Chinese Office Action dated Jan. 23, 2014, issued in Chinese application No. 201110144091.2, w/ English translation (15 pages).
Chinese Search Report dated Mar. 5, 2014, issued in Chinese application No. 201110303868.5, w/ English translation (5 pages).

* cited by examiner

METHOD OF MANUFACTURING OPTICAL WAVEGUIDE

BACKGROUND OF THE INVENTION

1. Field of the Invention

The present invention relates to a method of manufacturing an optical waveguide for widespread use in the fields of optical communications, optical information processing, position sensors, and other general optics technology.

2. Description of the Related Art

In general, an optical waveguide is configured in such a manner that cores serving as a passageway for light are formed in a predetermined pattern on a surface of an under cladding layer, and that an over cladding layer is formed so as to cover the cores. In particular, for the formation of the over cladding layer of a desired shape, e.g. the over cladding layer having an end portion in the form of a lens portion, a mold including a cavity having a mold surface of a shape complementary to the desired shape of the over cladding layer is used to form the over cladding layer (as disclosed, for example, in Japanese Published Patent Application No. 2008-281654).

The assignee of the present application has proposed a mold made of a light-transmissive resin which is excellent in dimensional accuracy as a mold for the formation of the over cladding layer, and has already applied for a patent (Japanese Patent Application No. 2010-126714). This mold is produced in a manner to be described below. First, a mold member of a shape identical with the shape of the over cladding layer is prepared, and is placed in a mold production container. Then, the container is filled with a light-transmissive resin, and the light-transmissive resin is cured. The cured light-transmissive resin is taken out of the container, and the mold member is removed. This provides a mold made of a light-transmissive resin in which a hollow resulting from the removal of the mold member serves as a cavity for the formation of the over cladding layer.

An optical waveguide is produced using the above-mentioned mold in a manner to be described below. First, the cavity of the mold is filled with a photosensitive resin for the formation of the over cladding layer. Then, cores formed on a surface of an under cladding layer are immersed in the photosensitive resin, and the under cladding layer is pressed against the mold. Next, the photosensitive resin is exposed to light through the mold, whereby the photosensitive resin is cured and formed into the over cladding layer. Thereafter, the mold is removed. This provides an optical waveguide including the under cladding layer, the cores, and the over cladding layer.

In the above-mentioned method of producing a mold made of a light-transmissive resin, the reduction in the wall thickness of the mold is preferable because it results in better exposure to irradiation light (or better light transmission properties) through the mold during the formation of the over cladding layer. This wall thickness reduction, however, gives rise to a tendency toward breakage of the mold (or toward worse molding properties) during the removal of the mold member in the step of producing the mold. The increase in the wall thickness of the mold, on the other hand, reduces the tendency toward the breakage of the mold (or improves the molding properties) during the removal of the mold member, but causes worse exposure properties (or worse light transmission properties) to result in poor formation of the over cladding layer. The mold made of the light-transmissive resin still has room for improvement in this regard.

Silicone resins are used as a material for the formation of the mold. Silicone resins, however, are still soft after being cured. For this reason, when the wall thickness of a mold made of a silicone resin is reduced, the mold is more prone to breakage (or prone to worse molding properties) during the removal of the mold member. Also, a cured body of silicone resin (or a mold made of a silicone resin) has a self-adsorptive property. Thus, even when the wall thickness of the mold made of a silicone resin is increased, the mold placed on a molding stage (or a molding worktable) during the formation of the over cladding layer is prone to be deformed by elongation due to uneven contact between the mold and the molding stage, resulting in a tendency toward the occurrence of dimensional error in the mold. The occurrence of the dimensional error in the mold causes the over cladding layer to have dimensions deviated from their design values, resulting in an improper positional relationship between the cores and the over cladding layer. As a result, a light beam emitted from a distal end of each of the cores is not appropriately narrowed down by the lens portion at an end of the over cladding layer, but exits the lens portion while being widened. This decreases the intensity of received light (or light propagation characteristics) on a light-receiving side.

SUMMARY OF THE INVENTION

A method of manufacturing an optical waveguide is provided using a mold that provides both molding properties and light transmission properties and that is free from dimensional error for the formation of an over cladding layer in the optical waveguide.

The method comprises the steps of: forming a core having a pattern on a surface of an under cladding layer; and forming an over cladding layer so as to cover the core by using a mold including a cavity having a mold surface complementary in shape to the over cladding layer. The step of forming the over cladding layer includes the substeps of filling the cavity of the mold with a photosensitive resin for the formation of the over cladding layer, and exposing the photosensitive resin to light through the mold, with the core immersed in the photosensitive resin, to cure the photosensitive resin, thereby forming the over cladding layer, the mold being made of a light-transmissive resin and provided with a light-transmissive support plate, the mold being produced by placing a mold member identical in shape with the over cladding layer in a mold production container, filling the container with a light-transmissive resin, bringing the light-transmissive support plate into contact with a surface of the light-transmissive resin, curing the light-transmissive resin in that state, fixedly securing the cured light-transmissive resin to the light-transmissive support plate, then taking the cured light-transmissive resin out of the container, and removing the mold member from the cured light-transmissive resin, whereby a hollow resulting from the removal of the mold member serves as the cavity for the formation of the over cladding layer.

To produce a mold for the formation of an over cladding layer which provides both molding properties and light transmission properties and which is free from dimensional error, the material for the formation of the mold, a method of producing the mold, and the like have been studied. Improvements are made to a method of producing a mold from a light-transmissive resin by molding using a mold member identical in shape with the over cladding layer. Specifically, a mold member identical in shape with the over cladding layer is placed in a mold production container, and the container is filled with a light-transmissive resin. Thereafter, a light-transmissive support plate is brought into contact with a surface of the light-transmissive resin. Then, the light-transmissive resin is cured in that state, and the cured light-transmissive resin is fixedly secured to the light-transmissive support plate. Thereafter, the cured light-transmissive resin is taken out of the container, and the mold member is removed from the cured light-transmissive resin. Thus, the mold made of the light-transmissive resin and provided with the light-transmissive support plate is produced.

Consequently, the mold is reinforced with the light-transmissive support plate, and if part of the light-transmissive resin of the mold has a reduced wall thickness, the breakage of the mold is not caused (or the mold is excellent in molding properties) during the removal of the mold member. The mold may be formed to have a reduced wall thickness, thereby providing good light transmission properties (good exposure properties through the mold). Because the light-transmissive support plate comes in contact with a molding stage (or a molding worktable) when the mold is placed on the molding stage during the formation of the over cladding layer, dimensional error in the mold is not caused due to uneven contact between the mold and the molding stage even when the light-transmissive resin serving as the material for the formation of the mold is a silicone resin.

In the method of manufacturing an optical waveguide according to the present invention, the mold for the formation of the over cladding layer is produced from a light-transmissive resin and a light-transmissive support plate by molding using a mold member identical in shape with the over cladding layer to cure the light-transmissive resin, and then by fixedly securing the cured light-transmissive resin to the light-transmissive support plate. Thus, the mold is reinforced with the light-transmissive support plate, and is excellent in molding properties during the removal of the mold member. Also, the mold may be reduced in wall thickness to have good light transmission properties. In the step of forming the over cladding layer, the light-transmissive support plate of the mold is brought into contact with the molding stage. For this reason, dimensional error in the mold is not caused due to uneven contact between the mold and the molding stage even when the light-transmissive resin serving as the material for the formation of the mold is a silicone resin. The good light transmission properties of the mold provide good exposure properties of the photosensitive resin for the formation of the over cladding layer to light through the mold. The good exposure properties, together with the occurrence of no dimensional error in the mold, achieve the good formation of the over cladding layer.

Preferably, the light-transmissive support plate is a quartz glass plate. In such a case, the light-transmissive resin may be heated after the light-transmissive support plate is brought into contact with the surface of the light-transmissive resin in the step of producing the mold. This increases the curing speed of the light-transmissive resin to thereby improve productivity. Heating the light-transmissive resin in the absence of the quartz glass plate causes the light-transmissive resin to have a wavy surface. The light-transmissive support plate made of a material other than quartz glass causes detrimental effects due to heating. In either case, an appropriate mold cannot be produced.

Preferably, a mold surface part of the cavity of the mold corresponding to a portion of the over cladding layer covering a distal end of the core is configured in the form of a lens-shaped curved surface. This provides an optical waveguide including an over cladding layer portion covering the distal end of the core and configured in the form of a lens portion. In this optical waveguide, a light beam emitted from the distal end of the core is restrained from diverging by refraction through the lens portion of the over cladding layer. Also, a light beam coming through the surface of the lens portion of the over cladding layer is narrowed down and converged by refraction through the lens portion when entering the distal end of the core. That is, the optical waveguide thus provided is excellent in light propagation characteristics.

Preferably, the light-transmissive resin serving as a material for the formation of the mold contains a silicone resin. This provides the mold with higher dimensional accuracy to accordingly provide an optical waveguide more excellent in light propagation characteristics.

DETAILED DESCRIPTION OF THE INVENTION

A preferred embodiment according to the present invention will now be described in detail with reference to the drawings.

In a method of manufacturing an optical waveguide according to the preferred embodiment, a mold M configured such that a cured body 20 of light-transmissive resin is fixedly secured to a light-transmissive support plate G is used for the formation of an over cladding layer 3 (with reference to FIG. 2D) in the optical waveguide. The mold M is formed from a light-transmissive resin and the light-transmissive support plate G. The light-transmissive resin is cured by molding using a mold member identical in shape with the over cladding layer 3, and the cured light-transmissive resin is then fixedly secured to the light-transmissive support plate G, whereby the mold M is produced. That is, the mold M is reinforced with the light-transmissive support plate G. This renders the mold M excellent in molding properties during the removal of the mold member, and also allows the mold M to have a reduced wall thickness of the cured body 20 of light-transmissive resin, thereby rendering the mold M excellent in light transmission properties. The production of such a mold M and the formation of the over cladding layer 3 by using the mold M are significant features of the present invention.

In the mold M (with reference to FIG. 2C) according to this preferred embodiment, the light-transmissive support plate G is fixedly secured to a lower surface of the cured body 20 of light-transmissive resin. The mold M includes two cavities 21 provided in an upper surface of the cured body 20 of light-transmissive resin and each having a mold surface complementary in shape to the over cladding layer 3. Each of the cavities 21 has one end portion (a left-hand end portion as seen in FIG. 2C) configured in the form of a lens-shaped curved surface 21a.

A method of manufacturing the mold M will be described in detail.

Figure 1A:
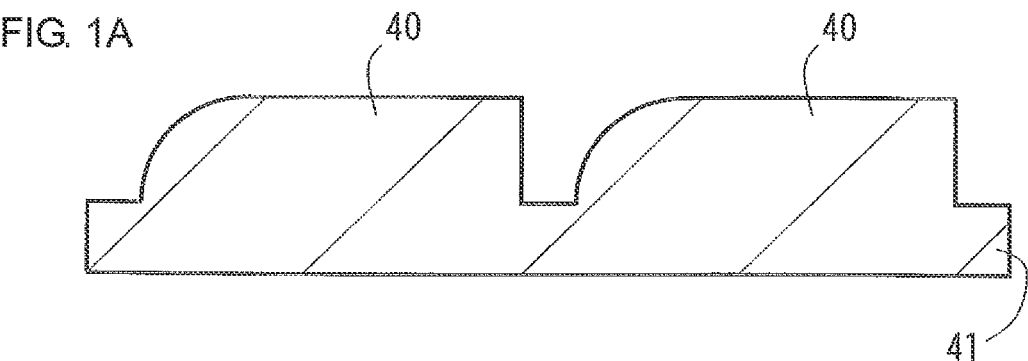
FIGS. 1A to 1C are views schematically illustrating a method of manufacturing a mold for the formation of an over cladding layer, which is used in a method of manufacturing an optical waveguide according to a preferred embodiment.

First, as shown in FIG. 1A, mold members 40 identical in shape with the over cladding layer 3 (with reference to FIG. 3) is produced, with the mold members 40 protruding upwardly from an upper surface of the base member 41. The production of the mold members 40 is achieved, for example, by cutting a plate-like member with a cutting blade. Examples of a material for the formation of the mold members 40 include aluminum, stainless steel, and iron. Of these, aluminum is preferred from the viewpoint of machinability.

Figure 1B:
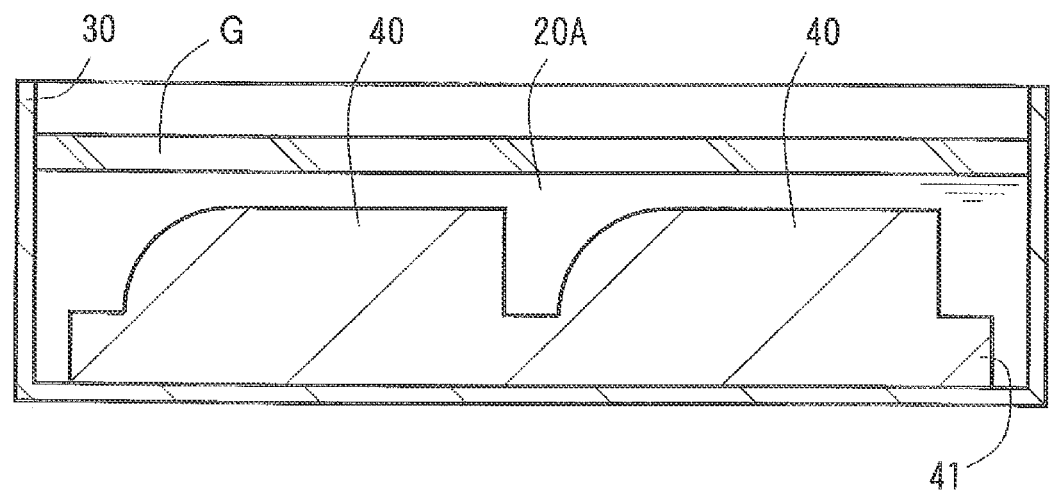

Then, as shown in FIG. 1B, the structure including the mold members 40 and the base member 41 is placed in a mold production container 30. At this time, the structure is preferably placed in the bottom of the container 30, with the mold members 40 located on an upper side and the base member 41 located on a lower side, as shown in FIG. 1B. It is also preferable to apply a mold release agent to an inner surface of the container 30 and to surfaces of the mold members 40 and the base member 41.

Next, as shown in FIG. 1B, the container 30 is filled with a liquid light-transmissive resin 20A so that the mold members 40 are entirely immersed in the light-transmissive resin 20A. Examples of the light-transmissive resin 20A include siloxane resins, acrylic resins, and epoxy resins. These resins are used either singly or in combination. In particular, the light-transmissive resin 20A preferably contains a silicone resin from the viewpoint of providing the mold M with high dimensional accuracy.

The light-transmissive support plate G is brought into contact with the surface of the light-transmissive resin 20A which fills the container 30, and the light-transmissive resin 20A is cured. The process of bringing the light-transmissive support plate G into contact with the surface of the light-transmissive resin 20A may be performed either immediately after the container 30 is filled with the light-transmissive resin 20A or after a certain period of time has elapsed so that the light-transmissive resin 20A is slightly cured. Preferably, this process is performed after approximately two days in which the degree of curing is appropriate for the light-transmissive support plate G to contact the surface of the light-transmissive resin 20A. For the curing of the light-transmissive resin 20A, an ordinary temperature atmosphere, a heated atmosphere or a combination of the ordinary temperature atmosphere and the heated atmosphere is employed depending on the types of light-transmissive resin 20A and light-transmissive support plate G.

Examples of a material for the formation of the light-transmissive support plate G include quartz glass, blue plate glass, polycarbonates, and acrylics. In particular, quartz glass is preferred from the viewpoint of allowing the light-transmissive resin 20A to be heated after the light-transmissive support plate G is brought into contact with the surface of the light-transmissive resin 20A. Heating the light-transmissive resin 20A increases the curing speed of the light-transmissive resin 20A to thereby improve productivity. The thickness of the light-transmissive support plate G is generally in the range of 0.5 to 5.0 mm from the viewpoints of reinforcement of the mold M (with reference to FIG. 1C), molding properties during the removal of the mold members 40 in the next step, and exposure properties (or light transmission properties) during the formation of the over cladding layer 3 (with reference to FIG. 2D).

Figure 1C:
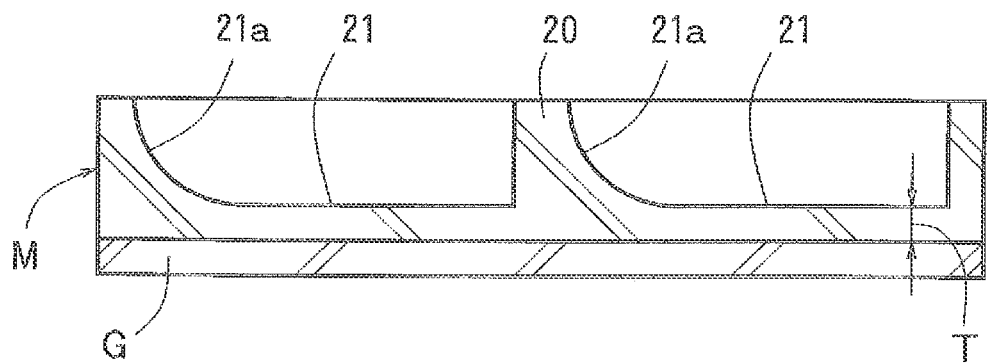

Thereafter, the cured light-transmissive resin which is fixedly secured to the light-transmissive support plate G is taken together with the mold members 40 and the base member 41 out of the container 30. Then, the structure including the mold members 40 and the base member 41 is removed from the cured light-transmissive resin. Hollows resulting from the removal of the mold members 40 serve as the respective cavities 21 (with reference to FIG. 1C) each having a mold surface complementary in shape to the over cladding layer 3 (with reference to FIG. 2D). Further, unnecessary portions of the cured light-transmissive resin which have been present laterally around the base member 41 are cut off, and portions (opposite end portions as seen in FIG. 1B) of the light-transmissive support plate G corresponding to the cut portions are also removed. In this manner, the mold M including the cured body 20 of light-transmissive resin and the light-transmissive support plate G is provided as shown in FIG. 1C (shown in an orientation vertically inverted from that shown in FIG. 1B).

During the removal of the structure including the mold members 40 and the base member 41, the mold M is excellent in molding properties without damage to the cavities 21 because the mold M is reinforced with the light-transmissive support plate G. The reinforcement with the light-transmissive support plate G allows the cured body 20 of light-transmissive resin to have a reduced wall thickness. For example, the cured body 20 of light-transmissive resin preferably has a thickness (wall thickness) T in the range of 0.5 to 5.0 mm as measured between the bottom surface of each of the cavities 21 and the upper surface of the light-transmissive support plate G as seen in FIG. 1C from the viewpoints of the molding properties, exposure properties (or light transmission properties) and the like.

Next, a method of manufacturing an optical waveguide will be described in detail.

First, a base 10 of a flat shape (with reference to FIG. 2A) for use in the formation of an under cladding layer 1 is prepared. Examples of a material for the formation of the base 10 include metal, resin, glass, quartz, and silicon. In particular, a stainless steel (SUS) substrate is preferably used as the base 10. This is because the stainless steel substrate is excellent in resistance to thermal expansion and contraction, so that various dimensions thereof are maintained substantially at their design values in the course of the manufacture of the optical waveguide. The thickness of the base 10 is, for example, in the range of 20 μm (in film form) to 5 mm (in plate form).

Figure 2A:
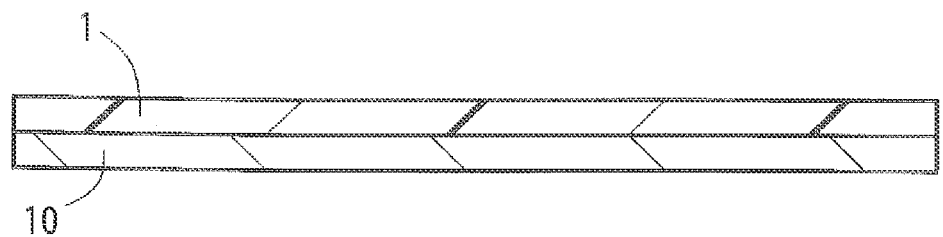
FIGS. 2A to 2D are views schematically illustrating a method of manufacturing an optical waveguide by using the mold.

Then, as shown in FIG. 2A, the under cladding layer 1 is formed on a surface of the base 10. Examples of a material for the formation of the under cladding layer 1 include thermosetting resins and photosensitive resins. When a thermosetting resin is used, a varnish prepared by dissolving the thermosetting resin in a solvent is applied to the surface of the base 10 and is then heated to thereby form the under cladding layer 1. When a photosensitive resin is used, on the other hand, a varnish prepared by dissolving the photosensitive resin in a solvent is applied to the surface of the base 10 and is then exposed to irradiation light such as ultraviolet light to thereby form the under cladding layer 1. The thickness of the under cladding layer 1 is, for example, in the range of 5 to 50 μm.

Figure 2B:
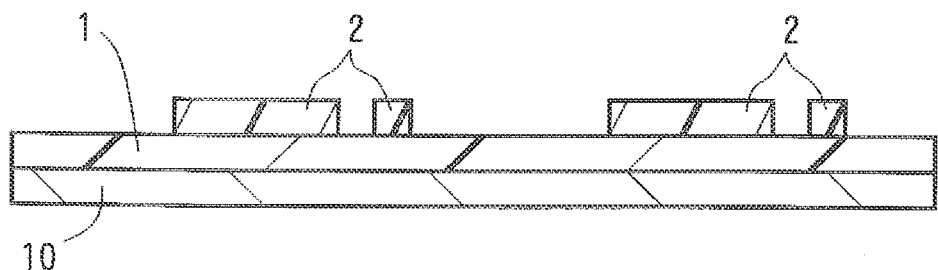
Figure 2C:
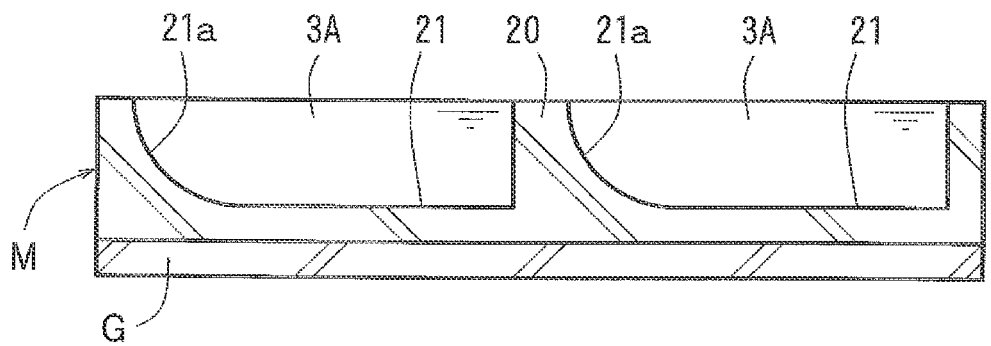

Next, as shown in FIG. 2B, cores 2 having a predetermined pattern are formed on a surface of the under cladding layer 1 by a photolithographic method. Preferably, a photosensitive resin excellent in patterning characteristics is used as a material for the formation of the cores 2. Examples of the photosensitive resin include UV-curable acrylic resins, UV-curable epoxy resins, UV-curable siloxane resins, UV-curable norbornene resins, and UV-curable polyimide resins. These resins are used either singly or in combination. Examples of the sectional configuration of the cores 2 include a trapezoid and a rectangle having excellent patterning characteristics. The width of the cores 2 is, for example, in the range of 10 to 500 μm. The thickness (height) of the cores 2 is, for example, in the range of 25 to 100 μm.

The material for the formation of the cores 2 used herein has a refractive index higher than that of the material for the formation of the under cladding layer 1 described above and the over cladding layer 3 to be described below (with reference to FIG. 3), and is highly transparent to the wavelength of light to be propagated. The refractive index is adjusted, i.e. increased or decreased as appropriate, by changing at least one of the type and content of an organic group introduced into the resins that are the materials for the formation of the under cladding layer 1, the cores 2 and the over cladding layer 3. As an example, the refractive index is increased by introducing a cyclic aromatic group (e.g., a phenyl group) into a resin molecule or by increasing the content of the aromatic group in the resin molecule. On the other hand, the refractive index is decreased by introducing a straight-chain or cyclic aliphatic group (e.g., a methyl group and a norbornene group) into the resin molecule or by increasing the content of the aliphatic group in the resin molecule.

Then, as shown in FIG. 2C, the mold M for the formation of the over cladding layer, which is produced in the above-mentioned step, is placed on a molding stage (not shown), with each cavity 21 positioned upwards. Each cavity 21 is filled with a liquid photosensitive resin 3A which is a material for the formation of the over cladding layer 3 (with reference to FIG. 2D).

Figure 2D:
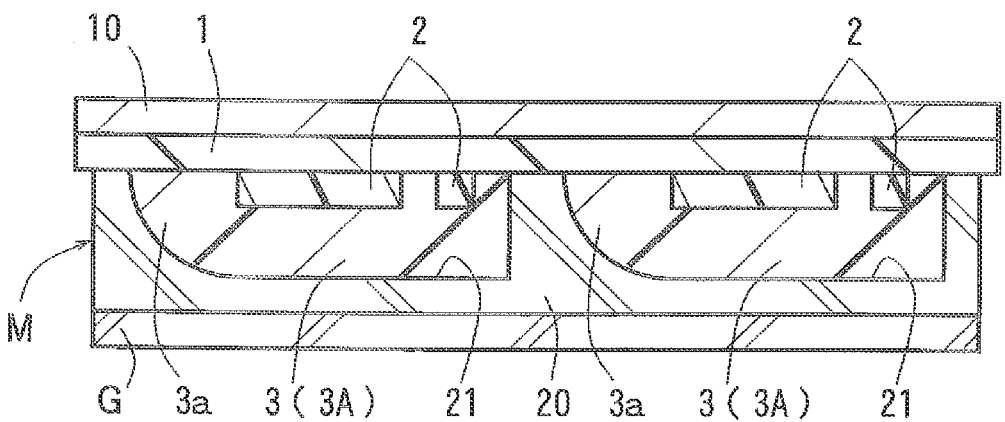

Then, as shown in FIG. 2D, the cores 2 formed in the predetermined pattern on the surface of the under cladding layer 1 are immersed in the photosensitive resin 3A serving as the material for the formation of the over cladding layer 3. In this state, the cores 2 are positioned relative to each cavity 21 of the mold M, and the under cladding layer 1 is pressed against the mold M. The pressing load at this time is, for example, in the range of 49 to 980 N. Part of the mold M where each cavity 21 is formed, which is made of resin, is resistant to pressure. This allows the under cladding layer 1 to be pressed against the mold M into intimate contact with the mold M, thereby preventing the formation of fins or burrs.

Next, irradiation light such as ultraviolet light is directed through the mold M onto the photosensitive resin 3A, whereby the photosensitive resin 3A is exposed to the irradiation light. This exposure cures the photosensitive resin 3A to form the over cladding layer 3 having one end portion configured as a lens portion 3a. The thickness of the over cladding layer 3 (as measured from the surface of the under cladding layer 1) is, for example, in the range of 25 to 1500 µm. The reinforcement of the mold M with the light-transmissive support plate G allows the cured body 20 of light-transmissive resin to have a reduced wall thickness. This provides good exposure properties through the mold M to achieve the good formation of the over cladding layer 3.

Figure 3:
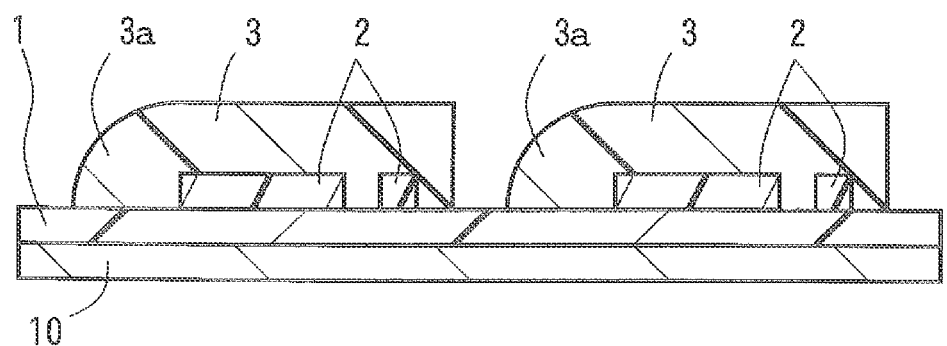
FIG. 3 is a sectional view schematically showing an optical waveguide provided by the method shown in FIGS. 2A to 2D.

The over cladding layer 3 together with the base 10, the under cladding layer 1 and the cores 2 is removed from the mold M. This provides an optical waveguide including the under cladding layer 1, the cores 2 and the over cladding layer 3 and provided on the surface of the base 10, as shown in FIG. 3 (shown in an orientation vertically inverted from that shown in FIG. 2D). In this preferred embodiment, two optical waveguides are produced, and will be individually separated from each other when each is used.

A heating treatment is performed, as required, before or after the removal of the over cladding layer 3 from the mold M. The base 10 is stripped, as required, from the under cladding layer 1.

The optical waveguide may be used as detection means (or a position sensor) for detecting a finger touch position and the like on a touch panel by forming the optical waveguide into an L-shaped configuration. Specifically, two L-shaped optical waveguides are produced each of which includes a plurality of cores 2 extending from a corner of the L-shaped configuration to inner edges thereof and arranged in a parallel, equally spaced relationship. Then, a light emitting element is provided outside the corner of one of the optical waveguides, and is optically coupled to the one optical waveguide. Further, a light receiving element is provided outside the corner of the other optical waveguide, and is optically coupled to the other optical waveguide. These optical waveguides are placed along the periphery of a rectangular display screen of the touch panel. This enables the optical waveguides to serve as detection means for detecting a finger touch position and the like on the touch panel.

In this preferred embodiment, one end portion of the over cladding layer 3 is configured as the lens portion 3a. However, the one end portion of the over cladding layer 3 may be of a flat configuration similar to that of the other end portion of the over cladding layer 3.

Next, an inventive example of the present invention will be described in conjunction with a comparative example. It should be noted that the present invention is not limited to the inventive example.

EXAMPLES

Material for Formation of Under Cladding Layer

A material for the formation of an under cladding layer was prepared by mixing 100 parts by weight of an epoxy resin having an alicyclic skeleton (EP4080E available from ADEKA Corporation), two parts by weight of a photo-acid generator (CPI-200X available from San-Apro Ltd.), and five parts by weight of an ultraviolet absorber (TINUVIN 479 available from Ciba Japan K. K.) together.

Material for Formation of Cores

A material for the formation of cores was prepared by dissolving 40 parts by weight of an epoxy resin having a fluorene skeleton (OGSOL EG available from Osaka Gas Chemicals Co., Ltd.), 30 parts by weight of an epoxy resin having a fluorene skeleton (EX-1040 available from Nagase ChemteX Corporation), 30 parts by weight of 1,3,3-tris{4-[2-(3-oxetanyl)]butoxyphenyl}butane, and one part by weight of a photo-acid generator (CPI-200K available from San-Apro Ltd.) in ethyl lactate.

Material for Formation of Over Cladding Layer

A material for the formation of an over cladding layer was prepared by mixing 100 parts by weight of an epoxy resin having an alicyclic skeleton (EP4080E available from ADEKA Corporation), and two parts by weight of a photo-acid generator (CPI-200K available from San-Apro Ltd.) together.

Production of Mold for Formation of Over Cladding Layer

A mold member identical in shape with the over cladding layer was produced, with the mold member protruding upwardly from an upper surface of the base member, by cutting an aluminum plate by means of a rotating cutting blade.

Then, the structure was placed in the bottom of a mold production container, with the mold member located on an upper side and the base member located on a lower side. It should be noted that, prior to the placement of the structure, a mold release agent was applied to an inner surface of the container and to surfaces of the mold member and the base member.

Next, the container was filled with a light-transmissive resin (polydimethylsiloxane SIM-260 available from Shin-Etsu Chemical Co., Ltd.) so that the light-transmissive resin had a depth of 1 mm as measured from an upper end surface of the mold member to a liquid surface of the light-transmissive resin. The light-transmissive resin was allowed to stand at room temperature (25° C.) for two days until the light-transmissive resin was slightly cured. Thereafter, a quartz glass plate (having a thickness of 3 mm) was brought into contact with the entire surface of the light-transmissive resin.

In that state, a heating treatment was performed at 150° C. for 30 minutes. Thus, the light-transmissive resin was completely cured.

Thereafter, while being fixedly secured to the quartz glass plate, the cured light-transmissive resin was taken together with the mold member and the base member out of the container. Then, the mold member and the base member were removed from the cured light-transmissive resin, and unnecessary portions of the cured light-transmissive resin were cut off. In this manner, a mold for the formation of the over cladding layer was provided which included a cured body of light-transmissive resin and the quartz glass plate. In this mold, a cavity for the formation of the over cladding layer had one end portion configured in the form of a substantially quadrantal curved lens surface as seen in sectional side view (having a radius of curvature of 1.4 mm). The mold also had a thickness of 1 mm as measured between the bottom surface of the cavity for the formation of the over cladding layer and the upper surface of the quartz glass plate.

Manufacture of Optical Waveguide

First, the material for the formation of the under cladding layer was applied to a surface of a stainless steel base (having a thickness of 50 μm) with an applicator. Subsequently, the applied material was exposed to ultraviolet light irradiation at a dose of 1500 mJ/cm². Thereafter, a heating treatment was performed at 80° C. for five minutes. Thus, the under cladding layer having a thickness of 20 μm (with a refractive index of 1.510 at a wavelength of 830 nm) was formed.

Next, the material for the formation of the cores was applied to a surface of the under cladding layer with an applicator. Thereafter, a heating treatment was performed at 100° C. for five minutes. Thus, a photosensitive resin layer was formed. Next, the photosensitive resin layer was exposed to ultraviolet light irradiation at a dose of 2500 mJ/cm² through a photomask (placed with a gap of 100 μm) having an opening pattern identical in shape with the pattern of the cores. Thereafter, a heating treatment was performed at 100° C. for ten minutes. Next, development was performed using an aqueous solution of γ-butyrolactone to dissolve away unexposed portions of the photosensitive resin layer. Thereafter, a heating treatment was performed at 120° C. for five minutes. Thus, the cores of a rectangular sectional configuration having a width of 20 μm and a height of 50 μm (with a refractive index of 1.592 at a wavelength of 830 nm) were formed into the core pattern.

Then, the mold for the formation of the over cladding layer was placed on a molding stage, with the cavity positioned upwards, and the cavity was filled with the material for the formation of the over cladding layer.

Then, the cores formed in the core pattern on the surface of the under cladding layer were immersed in the material for the formation of the over cladding layer. In this state, the cores were positioned relative to the cavity of the mold, and the under cladding layer was pressed against the mold (with a pressing load of 196 N).

Next, the material for the formation of the over cladding layer was exposed to ultraviolet light irradiation at a dose of 5000 mJ/cm² through the mold. This provided the over cladding layer (with a refractive index of 1.510 at a wavelength of 830 nm) including one end portion configured in the form of a lens portion (a substantially quadrantal convex lens portion as seen in sectional side view (having a radius of curvature of 1.4 mm)), and having a thickness of 950 μm as measured from a top surface of the cores.

Then, the over cladding layer together with the stainless steel base, the under cladding layer and the cores was removed from the mold. This provided an optical waveguide including the under cladding layer, the cores and the over cladding layer and provided on the surface of the stainless steel base.

COMPARATIVE EXAMPLE

An optical waveguide was produced in a manner similar to that in the inventive example except that the quartz glass plate was not used for a mold for the formation of the over cladding layer. Specifically, for the production of this mold, a mold production container was filled with a light-transmissive resin, as in the production of the mold in the inventive example. Then, the light-transmissive resin was allowed to stand at room temperature (25° C.) for five days without being treated until the light-transmissive resin was nearly cured. Thereafter, a heating treatment was performed at 150° C. for 30 minutes. Thus, the light-transmissive resin was completely cured. Then, the cured light-transmissive resin was taken together with the mold member and the base member out of the container. Thereafter, the mold member and the base member were removed from the cured light-transmissive resin, and unnecessary portions of the cured light-transmissive resin were cut off. In this manner, the mold for the formation of the over cladding layer was provided which was made of the light-transmissive resin. This mold had a thickness of 1 mm as measured between the bottom surface of the cavity for the formation of the over cladding layer and the lower surface of the mold. The cavity for the formation of the over cladding layer was damaged during the removal of the mold member and the base member in the production of this mold.

Then, using the mold made of the light-transmissive resin, an optical waveguide was provided in a manner similar to that in the inventive example.

Measurement of Intensity of Received Light

Two optical waveguides were produced in each of the inventive example and the comparative example. A light emitting element (a VCSEL available from Optowell Co., Ltd.) was optically coupled to a second end (an end where the lens portion was not formed) of one of the optical waveguides, and a light receiving element (a CMOS linear sensor array available from TAOS Inc.) was optically coupled to a second end of the other optical waveguide. These two optical waveguides were placed on opposite sides of a coordinate input area (having a diagonal dimension of 76.2 mm), with their lens portions opposed to each other. In this state, light having an intensity of 5.0 mW was emitted from the light emitting element, and the intensity of light received by the light receiving element was measured. As a result of the measurement, the received light intensity was 0.8 mW when the optical waveguides of the inventive example were used, and was 0.3 mW when the optical waveguides of the comparative example were used.

The aforementioned result shows that the optical waveguides of the inventive example are more excellent in light propagation characteristics than the optical waveguides of the comparative example.

Although specific forms of embodiments of the instant invention have been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention.

INDUSTRIAL APPLICABILITY

The method of manufacturing an optical waveguide according to the present invention is applicable to the manufacture of an optical waveguide which is used for optical communications, optical information processing, detection means (or a position sensor) for detecting a finger touch position and the like on a touch panel, and the like.

What is claimed is:

1. A method of manufacturing an optical waveguide, comprising:

forming a core having a pattern on a surface of an under cladding layer; and forming an over cladding layer so as to cover the core by using a mold including a cavity having a mold surface complementary in shape to the over cladding layer, wherein the forming of the over cladding layer includes:
placing the mold with the cavity of the mold positioned upwards,
filling the cavity of the mold with a photosensitive resin for the formation of the over cladding layer,
after the filling, immersing the core in the photosensitive resin, and
exposing the photosensitive resin to light through the mold, with the core immersed in the photosensitive resin, to cure the photo sensitive resin, thereby forming the over cladding layer, wherein the mold is made of a light-transmissive resin and provided with a light-transmissive support plate, wherein mold is produced by placing a mold member identical in shape with the over cladding layer in a mold production container, filling the container with a light-transmissive resin, bringing the light-transmissive support plate into contact with a surface of the light-transmissive resin, curing the light-transmissive resin in that state, fixedly securing the cured light-transmissive resin to the light-transmissive support plate, then taking the cured light-transmissive resin out of the container, and removing the mold member from the cured light-transmissive resin, whereby a hollow resulting from the removal of the mold member serves as the cavity for the formation of the over cladding layer.

2. The method according to claim 1, wherein the light-transmissive support plate is a quartz glass plate.

3. The method according to claim 1, wherein a mold surface part of the cavity of the mold corresponding to a portion of the over cladding layer covering a distal end of the core is configured in the form of a lens-shaped curved surface.

4. The method according to claim 2, wherein a mold surface part of the cavity of the mold corresponding to a portion of the over cladding layer covering a distal end of the core is configured in the form of a lens-shaped curved surface.

5. The method according to claim 1, wherein the light-transmissive resin serving as a material for the formation of the mold contains a silicone resin.

6. The method according to claim 2, wherein the light-transmissive resin serving as a material for the formation of the mold contains a silicone resin.

7. The method according to claim 3, wherein the light-transmissive resin serving as a material for the formation of the mold contains a silicone resin.

8. The method according to claim 4, wherein the light-transmissive resin serving as a material for the formation of the mold contains a silicone resin.

* * * * *